United States Patent [19]

Edgar

[11] Patent Number: 5,265,200
[45] Date of Patent: Nov. 23, 1993

[54] SYSTEM AND METHOD FOR AUTOMATIC IMAGE SATURATION, GAMMA, AND EXPOSURE CORRECTION IN A DIGITIZING VIDEO CAPTURE SYSTEM

[75] Inventor: Albert D. Edgar, Austin, Tex.

[73] Assignee: International Business Machines Corporation, Armonk, N.Y.

[21] Appl. No.: 608,124

[22] Filed: Nov. 1, 1990

[51] Int. Cl.$^5$ .................................................. G06F 15/62
[52] U.S. Cl. .................................... 395/131; 395/132; 358/518; 382/51
[58] Field of Search .................... 395/118, 131, 132; 382/51; 358/111, 80

[56] References Cited

U.S. PATENT DOCUMENTS

| | | | |
|---|---|---|---|
| 4,729,016 | 3/1988 | Alkofer | 358/80 |
| 4,866,511 | 9/1989 | Belmares-Sarabia et al. | 358/27 |
| 4,868,651 | 9/1989 | Chou et al. | 358/111 |
| 4,888,636 | 12/1989 | Abe | 358/80 |
| 4,903,310 | 2/1990 | Takeo et al. | 382/51 X |
| 4,931,864 | 6/1990 | Kawamura et al. | 358/80 |
| 4,961,117 | 10/1990 | Rumley | 358/461 |
| 4,970,598 | 11/1990 | Vogel | 358/213.18 |
| 4,989,079 | 1/1991 | Ito | 358/80 |
| 4,996,591 | 2/1991 | Kadowaki et al. | 358/80 |
| 5,008,739 | 4/1991 | D'Luna et al. | 358/21 R |
| 5,014,123 | 5/1991 | Imoto | 358/75 |
| 5,047,861 | 9/1991 | Houchin et al. | 358/213.15 |
| 5,053,867 | 10/1991 | Yamamoto et al. | 358/80 |
| 5,060,061 | 10/1991 | Shishido et al. | 358/80 |
| 5,077,605 | 12/1991 | Ikeda et al. | 358/75 |
| 5,081,485 | 1/1992 | Terashita | 355/38 |
| 5,083,204 | 1/1992 | Heard et al. | 358/113 |

Primary Examiner—Mark K. Zimmerman
Attorney, Agent, or Firm—Robert M. Carwell

[57] ABSTRACT

Analog video data input is received by a video capture system and digitized. From the pels of the captured image, a gray scale level histogram is constructed with the system processor, and normalized to established white-black references similar to the contrast control function at image capture time. Peaks likely attributable to image artifacts are limited. The image processor then performs a second order best fit regression of the histogram from which the image is thereafter corrected. An automatic correction of the image contrast is thereby effected, wherein capture artifacts are reduced while retaining those of the image. In an alternate embodiment, instead of limiting peaks, an iterative best fit is performed, wherein the peaks are weighted in a subsequent best fit pass as a function of their distances from the curve fit from a prior best fit pass.

12 Claims, 6 Drawing Sheets

SYSTEM AND METHOD FOR AUTOMATIC IMAGE SATURATION, GAMMA, AND EXPOSURE CORRECTION IN A DIGITIZING VIDEO CAPTURE SYSTEM

TECHNICAL FIELD

This invention relates to image capture and display systems, and more particularly, relates to computer controlled systems for enhancing digitized video images.

BACKGROUND ART

In the field of digital video technology, a problem often arises with captured images similar to that encountered in the photographic arts, namely the contrast of the image is defective and in need of correction.

Several methods have been employed in the past to correct such defects. For example, it is known in the satellite image processing art to effectively flatten the gray scale histogram of the image without attempting to sort out and treat differently the artifacts attributable to the image, which are desirable, from those of the image capture process which are undesirable anomalies.

Such technology provides a high entropy image and is quite helpful with respect to images encountered in space exploration. However, when applied to natural images more typically encountered in multimedia work, the result can often include very disturbing and unnatural appearing artifacts associated with the capture process as, for example, in a grainy appearance of the sky in an outdoor image.

Technology has further been developed to permit manual adjustment of contrast levels as, for example, in equipment employed in photographic film processing to produce photographic images. A correction curve employed by the equipment may be adjusted by hand, for example, in a commercial slide service establishment, wherein an operator may raise highlights, lower shadows, raise medium grays, lower middle grays, or the like, so as to enhance or reduce undesirable characteristics of the photograph such as saturation.

In a related area, it has been known to provide various forms of video signal processing equipment which permits the operator to manually adjust the contrast or gamma of the captured video signal. While such manual techniques provide the opportunity for great flexibility and artistic input these same characteristics also give rise to numerous problems. Perhaps the most obvious of these is the need for skilled operators and their subjective judgement, as well as the repeatability and consistency of the artistic judgements which are being made.

It was accordingly highly desirable in some applications, such as in commercial multimedia systems, to make provision for some form of automatic gamma or contrast adjustments in the video image whereby these artistic functions might be performed heuristically without user intervention. Certainly various automatic contrast schemes have been devised in the image processing and photographic arts in seeking to remove the human variable, as, for example, in the automatic range setting of black-white levels or automatic brightness controls in some forms of video equipment. In some cases, for example in commercial photography, an average of gray scales in the image is sometimes taken and the brightness level set as a function of this average. In more sophisticated equipment, automatic processing circuitry may examine the image for the brightest and darkest levels and set the contrast as a function of these levels.

A serious problem with these automated approaches, however, is that again there is no attention given to seeking to discriminate between image artifacts and undesirable capture artifacts. A technique was thus highly desired which could automatically perform basic contrast correction on captured images without user intervention while at the same time removing from the image only the artifacts introduced by the capture process.

SUMMARY OF THE INVENTION

Analog video data input is received by a video capture system and digitized. From the pels of the captured image, a gray scale level histogram is constructed with the system processor, and normalized to established white-black references similar to the contrast control function usually available at image capture time. Peaks likely attributable to image artifacts are limited. The image processor then performs a second order best fit regression of the histogram from which the image is thereafter corrected. An automatic correction of the image contrast is thereby effected, wherein capture artifacts are reduced while retaining those of the image. In an alternate embodiment, instead of limiting peaks, an iterative best fit is performed wherein the peaks are weighted in a subsequent best fit pass as a function of their distances from the curve fit from a prior best fit pass.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment when read in conjunction with the accompanying figures where:

DETAILED DESCRIPTION OF THE PREFERRED EMBODIMENT

Figure 1:
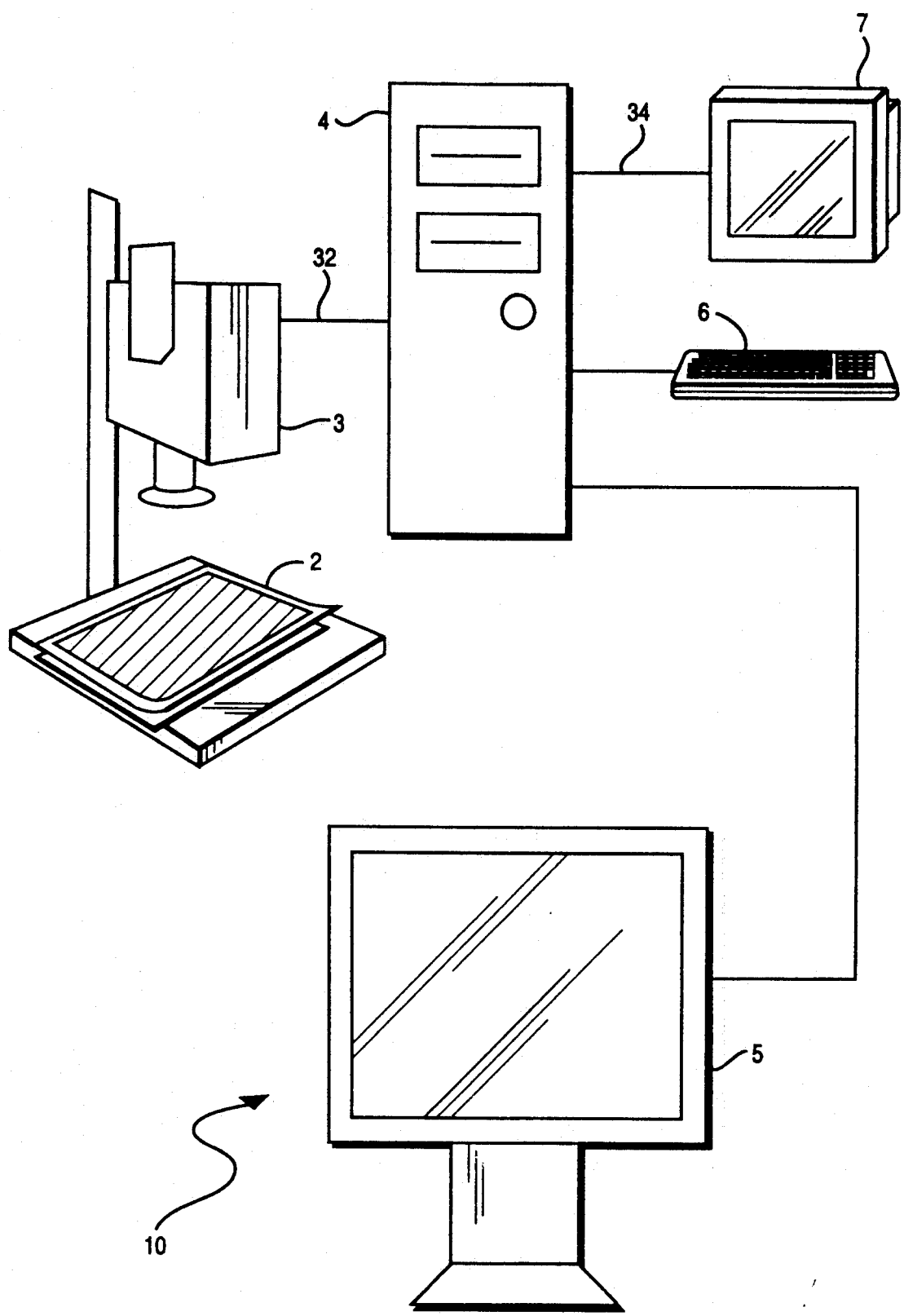
FIG. 1 is a functional block diagram depicting a computerized video image capture and processing system.

First, a description of the problem addressed by the subject invention will be provided along with a more general description of the system for effecting automatic gamma correction. This will then be followed by a description of a video capture and processing system with reference to FIGS. 1 and 2 adapted for use in effecting the invention. Next, a high level description of the digital processing of the captured image in accordance with the invention will be given with reference to FIGS. 3 and 4. This will then be followed by a more detailed description of a particular embodiment of the digital signal processing with reference to FIGS. 5-10.

The system of the subject invention provides the artistic function heuristically without user intervention by automatically performing basic contrast correction on a captured image. In order to do so, as a broad overview of the functions to be performed which will be disclosed later in more detail, the system must analyze the image, determine limitations in the capture process, separate anomalies caused by capture system limitations from desirable features of the image, and thence remove only the artifacts introduced by the capture process. It will be noted that although the particular embodiment disclosed herein will operate only on the shape of the gray scale, thereby effecting only contrast, and will not attempt to correct color or sharpness, such color and sharpness will be improved subjectively by improving the contrast.

In order to more clearly understand the problem addressed by the present invention, it will be appreciated that if a test image containing all levels of gray uniformly distributed therein was captured with a system having capture anomalies, a histogram built from the capture of this test image could be used directly in correction routines for subsequent more useful images to remove these capture anomalies.

One problem in the real world, however, is that such a test image often is simply not available. As but one example, an image in a book we desire to digitize has already been captured by the camera which includes the capture anomalies, along with the information we want to preserve defining the image also added in. In the simplest terms, the system disclosed herein seeks to see through the characteristics of the image to the underlying defects of the capture process. It then seeks to essentially regenerate the test histogram we would have obtained if a plain gray scale test image had first been captured from which to calibrate.

Before further discussing broadly the technique implemented herein, certain assumptions must be noted about the capture process itself. It is first assumed that peaks in the gray scale histogram of an image imply areas of relatively solid colors indicating an image artifact and not a capture artifact. These peaks will accordingly be ignored as described in the limiting step of the preferred embodiment.

A second assumption relates to the degree of smoothness desired in the curve fitting to the histogram which in the preferred embodiment is effected by means of a second order or quadratic fit. The higher the order, i.e. the larger the n in $X^n$ employed in the curve fit, the more detailed variations of the actual histogram curve are being accounted for in the curve fitting. Higher order curve fitting (employing terms such as $X^3$ and $X^4$) are empirically found not to map to definite physical capture defects. This is contrasted with X and $X^2$ terms which are found empirically to map quite closely to gamma and saturation in the types of images normally encountered with respect to conventional multimedia work. By accounting for these faster changes in the histogram curve by higher order curve fitting, the danger is increased that image artifacts are being picked up. Consequently it is a feature of the invention that second order fitting has been applied so as to ignore these artifacts. In other words by performing a second order best fit, this effectively serves as a way of seeing through a class of image anomalies as we otherwise would have done if the aforementioned test gray scale was available.

It is thus assumed, as one feature of the invention, that the capture process warps the gray scale curve with a quadratic of the form $A+Bx+Cx^2$. Any higher order terms. i.e. any more abrupt changes. arise from image features we desire to preserve or from uncorrectable capture defects such as saturated whites and blacks as previously noted. The "A" term simply relates to the number of pels in the image and is algorithmically uninteresting. The remaining terms, however, represent the two major factors which can go wrong in image capture which are contrast and saturation.

The "B" empirically measures or maps to gamma i.e. true contrast. If this "B" coefficient is negative, this implies there are too many dark pels and not enough light pels and thus the image appears dark and "contrasty". A negative B quantifies a very common problem when videographically capturing from a print or slide, for example, in which the gamma of both the photographic media and the electronic media add together. A positive B quantifies an image with too little true contrast. The image may still have full blacks and whites, but in between the image is too light highlight detail is faint, and the image looks lifeless. Stated differently a negative B image typically corresponds to a high gamma containing lots of dark values, referred to as "low key" in the art, while a positive B image would be low gamma and contain lots of white values, referred to as "high key".

The "C" term quantifies saturation, seen as the "toe" toward the intersection of the axis in the gray scale curve toward black and the "shoulder" of the curve at the rightmost end thereof. A positive "C" typically indicates that either or both the highlights or shadows are saturating, indicated by a rise at the end of the gray scale graph. The "B" term works with the "C" term to specify if the shadows, highlights, or both are being compressed by saturation. It is for this reason that the B term needs to be interpreted in light of the C term value in accordance with the invention. Sometimes an image produces a negative C, it will be noted, as could happen if there were brilliant highlights which should not be clipped but rather need to be compressed to allow gray scale room for the rest of the image to be seen.

Broadly, the process of the invention is comprised of three steps. First the image is digitized or captured with an appropriate digital video capture system such as that hereinafter described generally. With the thus-captured pels in storage, a gray scale histogram is created. The creation of histogram in this first step essentially builds a graph showing the frequency of occurrence for each level in the gray scale. A schematic of such a representative histogram may be seen in FIG. 6. This graph will contain all information about the image employed in the image processing steps utilized to generate the corrected image. As an example, if the original image included too many dark shadows, a hump would appear at the bottom of the graph in the vicinity of reference numeral 84, whereas if the original image was underexposed, the top of the graph would approach 0 as indicated as reference number 85 in FIG. 6.

As a next step in the image processing, the image is thence corrected by redistributing gray levels so the gray scale graph is more uniform. For example, if the original had too many dark shadows, each gray scale step in the shadows of the original might translate to two gray scale steps in the shadows of the corrected image, thereby spreading steps over a wider range and reducing the hump at the bottom of the graph. In like manner, if the original was underexposed, the top of the gray scale would be compressed during correction, compressing rarified gray scale steps into former steps, thus raising the number of pels at each step up to a norm. By making each state in the gray scale more nearly equal in probability across the image, the "information content" of the image goes up in accordance with formulas from information theory well known in the art. Because the human eye desires to perceive "information" presented clearly, the aesthetic appeal of the image will thereby usually be improved.

Thus, it will be appreciated that in the second step of the process, stated differently, the process is seeking to synthesize a gray scale histogram e.g. to recover what would have been obtained as a histogram from the test gray scale disposed in front of the camera. In regressing to such a synthesized gray scale histogram, it should be readily apparent that this regression from the histogram of the capture is seeking to predict the histogram of the ideal test gray scale, in other words, what the gray scale histogram would have looked like based upon a priori knowledge of what artifacts would belong to the image and which artifacts would belong to defects in the capture process. Thus the process seeks to sort out these differing image and capture artifacts in performing this regression.

An extreme correction would rearrange the gray scale so that each gray step in the corrected image had the same number of image pixels associated with it. Such an extreme correction would, in a mathematical sense, yield the most "information" since each state would now have equal probability. However, the gray scale curve could become disjointed causing small area artifacts. Moreover, large areas of the image with the same gray level such as the aforementioned sky in the prior art associated with space exploration image processing, would be assigned too much contrast and would therefore appear grainy. Accordingly, a difficult aspect of the processing of the invention is in the determination of what characteristics of the gray scale graph are in fact from these capture artifacts which should be corrected and which parts are from capture artifacts which cannot be corrected, and further which parts are from image characteristics that should not be corrected. As an example of portions which cannot be corrected, highlights may have been so overexposed and saturated as to essentially have disappeared.

As a third step in the image processing in accordance with the invention, from aforementioned regression to the gray scale histogram which the process seeks to synthesize and from the captured image, the image is thereby corrected according to the best fit. Relative to effecting this best fit, one of the most difficult problems addressed by the subject invention is in the determination of which artifacts of the curve are caused by the image which are desired to be preserved versus those caused by defects in the capture process itself. Examples of the latter include underexposing film excessive gamma, or some portion of the image which has saturated. Certain characteristics of the image have been discovered to indicate which sort of artifact is present and are employed in the image processing in an effort to attempt to separate them in the best fit.

Figure 2:
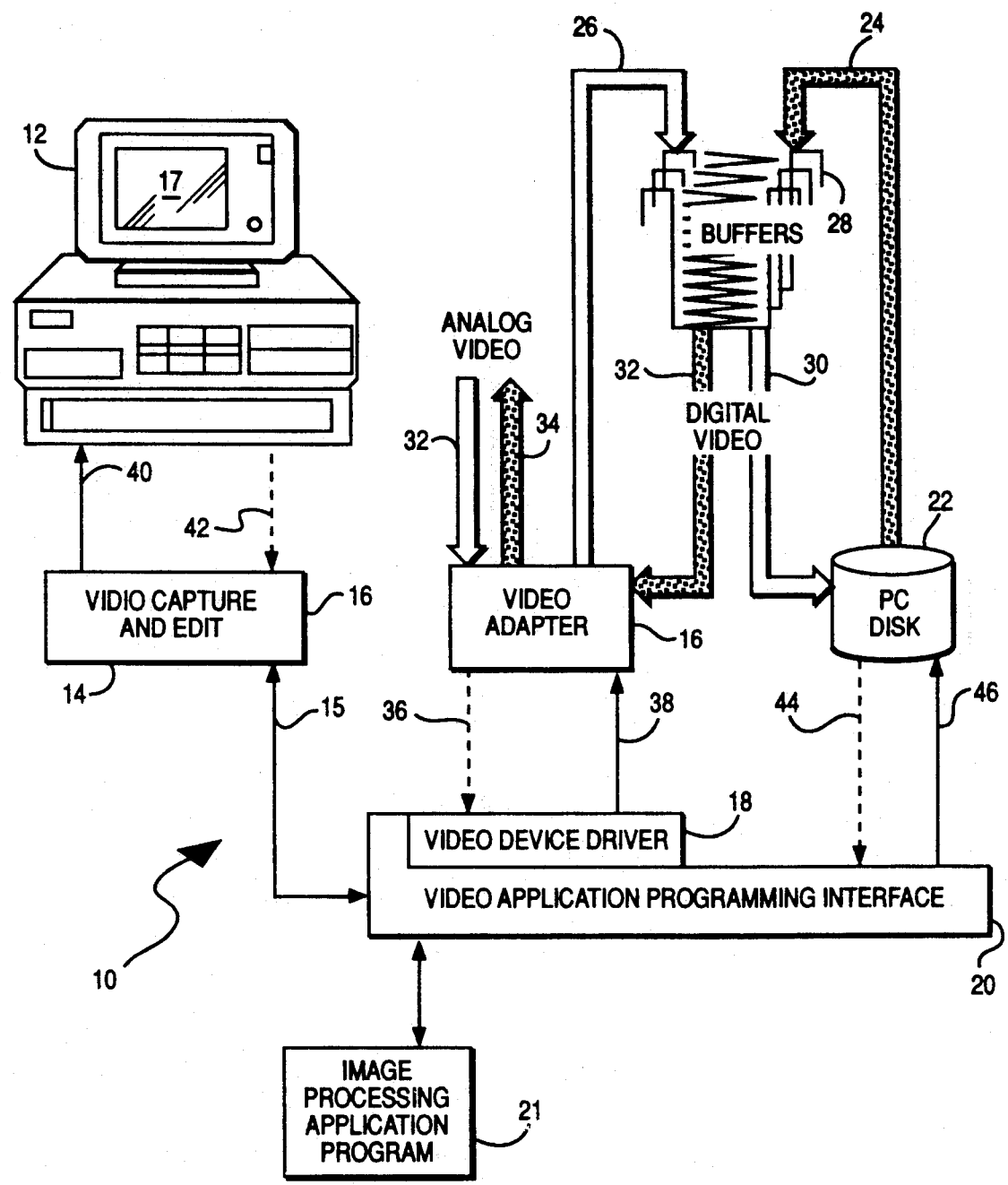
FIG. 2 is a more detailed block diagram of the system of FIG. 1.

Now that a general overview of the image processing of the invention has been presented, a representative digital video capture and processing system adapted to the present invention will be described with reference to FIGS. 1 and 2 after which will follow a more detailed description of a particular preferred embodiment of the processing. One such system which may be employed in the manner depicted in FIGS. 1 and 2 is the Audio Visual Connection or AVC system which includes both the hardware and software necessary for the aforementioned capture, processing, and display of analog video data. This system is manufactured by the IBM Corporation of Armonk, N.Y. Supporting documentation for such a system may be found in the following publications which are herein incorporated by reference: *IBM Audio Visual Connection User's Guide* and the *Video Capture Adapter Installation and Technical Reference Manual*, both of which are available from the IBM Corporation.

With reference now to the figures and in particular with reference to FIG. 1, there is depicted therein in block diagram form a digital computer system 10 which may be employed in accordance with the system and method of the present invention. As may be seen, system 10 may preferably take the form of a digital personal computer and includes a keyboard 6 for providing user input which is coupled to a central processing unit or host PC 4 in a manner well known in the art. Included in the host 4 are memory devices, which may comprise both volatile and non-volatile memory storage devices and which may include auxiliary memory devices such as magnetic disk or tape storage.

Host 4 is also coupled to one or more display drivers (not shown) which are utilized, in a manner well known in the art, to provide a visual display of video images by coupling appropriate control and data signals from the host 4 to the display 5 and one or more monitors 7. Those skilled in the art will appreciate that the display 5 and monitor 7 may be provided by a variety of devices such as those adapted to receive analog video in varying formats such as RGB. Y/C, NTSC, and the like.

In the system 10 shown in FIG. 1, a video camera 3 is further included having an analog video link 32 to the host 4. The camera 3 is shown to be trained on an object 2 having visual images to be digitized by the system 10. In a manner to be hereinafter described, the camera 3 will transfer the visual image of object 2 into analog electronic signals carried on the link 32 to the host 4 wherein they will subsequently be digitized, processed and reconverted into analog form for output on analog output link 34 after which they are displayed on one or more monitors 7. The system 10 may, of course, include other components and as to the general digital computer and display portions, the system may preferably be implemented by means of an IBM Model No. 80

PS/2 computer manufactured by International Business Machines Corporation of Armonk, N.Y.

The host 4, as is common in personal computers, includes a bus system facilitating data, control, and address I/O to various components of the system in a manner well known in the art. In particular with respect to the aforementioned Model 80 host 4 a proprietary Micro Channel TM bus system is employed which is desired in a preferred embodiment of the system 10.* Micro Channel is a trademark of the International Business Machines Corporation. However, the invention is not intended to be so limited to a particular bus structure and contemplates use with other bus structures. More detailed information regarding this microchannel bus structure and operation may be obtained with reference to the technical manuals accompanying the Model 80 machine which is incorporated herein by reference.

Also with respect to the system 10 depicted in FIG. 1, although analog video input signals on link 32 have been shown as originating from the camera 3, it will be readily appreciated that such analog video source material may be generated from a number of other sources such as the familiar VCR. VTR (video tape recorder), or the like and accordingly the invention is not intended to be limited to use with any particular source for generating such analog signals. As is well known in the art, these sources of analog video signals may be in a number of formats such as the aforementioned RGB, Y/C. composite video, or other formats. Although only one source of such formatted video information is shown in FIG. 1, it is well known of the invention to accommodate a plurality of multiformat sources for subsequent digitizing in the host 4 of their respective video images or data, processing thereof, and subsequent re-conversion back to analog video signals for simultaneous display on one or more display devices. A computer monitor 5 has been shown in FIG. 1 which conventionally comprises a portion of a general personal computer system including the host 4 and is used for conventional purposes of I/O with the host 4. However, as hereinbefore noted, a monitor 7 has further been included for display of these re-converted analog video signals.

Referring again briefly to the bus structures associated with personal computer systems 10, it is conventional to provide in the various available hosts 4 a plurality of adapter card or expansion slots. The purpose of these slots is to enable a user to custom configure a system to perform desired functions in the preferred embodiment, an adapter card in one of the slots will carry connectors for receiving raw analog video source data in multiple formats and multiplexing/control hardware and the like on the card which, under computer control by interfacing with the aforementioned bus, will select one of these signals for digitization. This adapter card will further include the analog-to-digital circuitry necessary to digitize this preselected signal. Due to interconnection of the adapter card with the bus, it will be readily appreciated that a feature of the invention is to provide for processing and editing of this thereby digitized image under control of the host 4 computer through the bus to eliminate motion artifacts in a manner to be described. A further function of the adapter card is to then re-convert the processed/edited digitized video information into analog form, such function also being performed on board on the card by provision of appropriate digital-to-analog conversion circuitry.

Finally, with respect to the preferred embodiment to be hereinafter described in greater detail, encoder circuitry is provided on board (meaning on the adapter card) whereby when the digitized video signals are re-converted to analog form they are converted in multiple formats. Multiple connectors are provided on the card each carrying a different one of these re-converted digitized signals in a different one of the conventional analog video formats. In this manner, by connecting a monitor to each such connector adapted to receive that connector's particular signal format, simultaneous display of the video image in multiple formats results. It will be noted that this re-conversion is also under computer 4 control inasmuch as the adapter card and associated encoder circuitry is plugged into the interface bus of the computer 4.

With reference now to FIG. 2, a more detailed functional block diagram of the system 10 of FIG. 1 is illustrated which will now be described.

As shown at line 32 analog video input signals in a variety of formats are received by the video adapter 16 of the invention. The video adapter 16 is connected to the host system 12 by the video device driver 18 which receives status from the adapter on lines 36 and sends commands and data to registers of adapter 16 on line 38. The bus of the system 10 is illustrated graphically in part by output on line 26 going from adapter 16 into the video buffers 28 inside the host processor 12. Further function of this bus is illustrated by line 30 indicating information stored in this video buffer 28 may be loaded into host storage such as a PC hard disk 22. From storage 22 via the bus, again illustrated by a line. 24, data can be received from the disk and put back into the buffer 28 of host 12. From these buffers 28 data may also be read and then sent back via the host bus connection to the adapter 16 on line 32 to load video data into the video memory of the adapter 16.

A video device driver 18 has a video application programming interface 20 which directly interfaces as shown by line 15 with the video capture and edit capability or function 14 of the host system 10. The application programming interface 20 provides microcommands for the video capture and edit process that are ultimately delivered to the video adapter 16 via the device driver box 18. As a result of execution of the video capture and edit program 14 commands are sent via lines 40 to and status information is received via lines 42 from the system processor of host 12. This results in an image being displayed on the screen of one or more monitors 7. FIG. 1. The screen 17 of host 12 will generally be reserved for display of non-source material, i.e.. the more conventional I/O data associated with personal computer systems. Such data includes operator input from keyboard 6, and user-interface information from the host 12 for operating the capture and display features of the invention. The displayed image may be live or a composite image including images controlled by the function selected by the video capture and edit module. The path 15 between the video capture and edit function 14 and the application programming interface 20 is via microcommands which are then in turn converted into individual separate commands and status requests across lines 36 and 38. As hereinbefore suggested functions indicated by lines 32. 30. 24 and 26 are all actually handled via the bus itself of system 10 and generally represent disk 22 I/O and adapter card 16 I/O.

It will be appreciated from the foregoing that once the image has been captured in the form of digitized representations of pels of various frames of video data by means of the system depicted in FIGS. 1 and 2, software may be provided for the host processor 12 for manipulating such data in any desired manner. It is of course a feature of the invention to provide such a computerized process for operating on this digitized data in the manner herein described in accordance with the invention to effect the desired image correction. Thus an image processing application program 21 of the invention may be provided to interface with the video application programming interface 20 so as to effect the desired manipulation and transformation of these digital representations of the pels. The pels are stored in the PC disk 22 and buffers 28 prior their restorage on PC disk 22 or being output through video adapter 16 as analog 34 for display of an enhanced image. The system 10, in accordance with the invention, has thus generated an enhanced image eliminating the undesirable capture artifacts by the processing software interacting with the system 10.

Now that a description of the capture system has been provided having the capability of image capture, processing in accordance with invention under software control and display, the detailed description of the processing of these digital representations of capture pels by the processing application in accordance with the invention will be provided.

Figure 3:
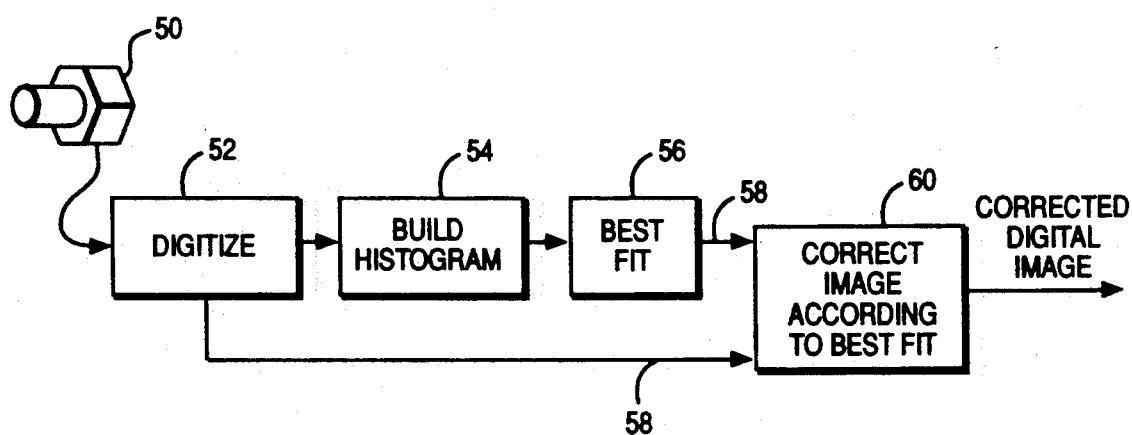
FIG. 3 is a schematic representation of the process for capturing an image and effecting automatic gamma correction to generate a corrected digital image in accordance with the invention.

In FIG. 3 there may be seen a schematic representation of the foregoing general description of the capture and processing of the invention. The image captured by a suitable source such as a camera 50 is digitized as shown as block 52, whereupon the video system constructs the histogram at block 54 to be hereinafter detailed with greater specificity. The histogram thus created thence has a best fit curve generated to model it, shown at block 56. The original image digitized at block 52 is then functionally altered in accordance with the best fit curve generated at block 56 as shown schematically by the arrows 58 and block 60, resulting in a digital image corrected automatically for contrast.

Figure 4:
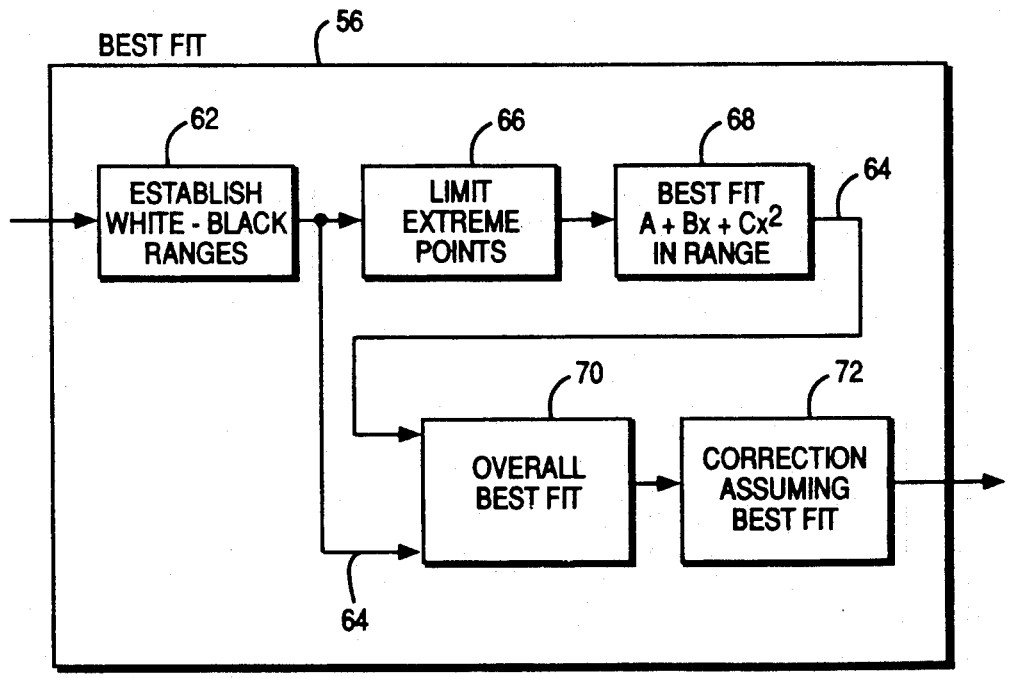
FIG. 4 is a more detailed flow diagram of the step of establishing a second order best fit depicted in FIG. 3.

The best fit block 56 of FIG. 3 is further expanded in FIG. 4. First, the gray scale range is limited to an appropriate range in block 62. Within this range, extremely high or low histogram counts are limited in block 66, and the quadratic best fit of the resulting histogram within the limited gray scale range is computed in block 68. The range and best fit date are integrated in block 70 to give the overall best fit, from which the gray-scale correction function is found in block 72 that will be applied to correct the original image.

Figure 5:
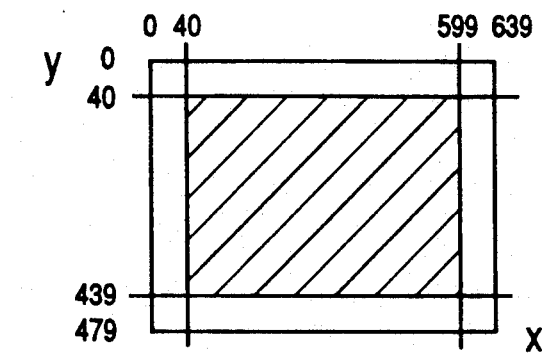
FIG. 5 is a schematic illustration of a captured image illustrating the cropping of the edge data.

In the detailed illustration of the processing of the captured image, such a digitized image may be seen schematically depicted as image 80 in FIG. 5. The processing to effect image correction of the invention may be implemented in the application program 21 of FIG. 2. This program may be readily implemented by one skilled in the programming arts with reference to the accompanying description and figures.

In the first detailed step of the processing, which may, for illustrative purposes be a 480×640 image system, the center of the image of FIG. 5 would first be scanned as, for example, from X=40 to 599 and Y=40 to 439. Doing so eliminates potential problems associated with image edges well known in the art. As one example, by international standard, a conventional 35 millimeter negative film area is defined by 24×36 millimeters. The outer portion of this area is typically covered by the frame and thus in the processing herein described, these edges would be deleted from the image. As but another brief example of edge problems obviated in this step, captured images may frequently include too much undesired image characteristics such as sky or extreme shadows.

In this detailed example, it is assumed that the red, green, and blue records of image 5 are digitized to 6 bits and therefore can take on $2^6=64$ possible values. These discrete values are represented as discrete points along the horizontal axis in FIGS. 6–9.

Figure 6:
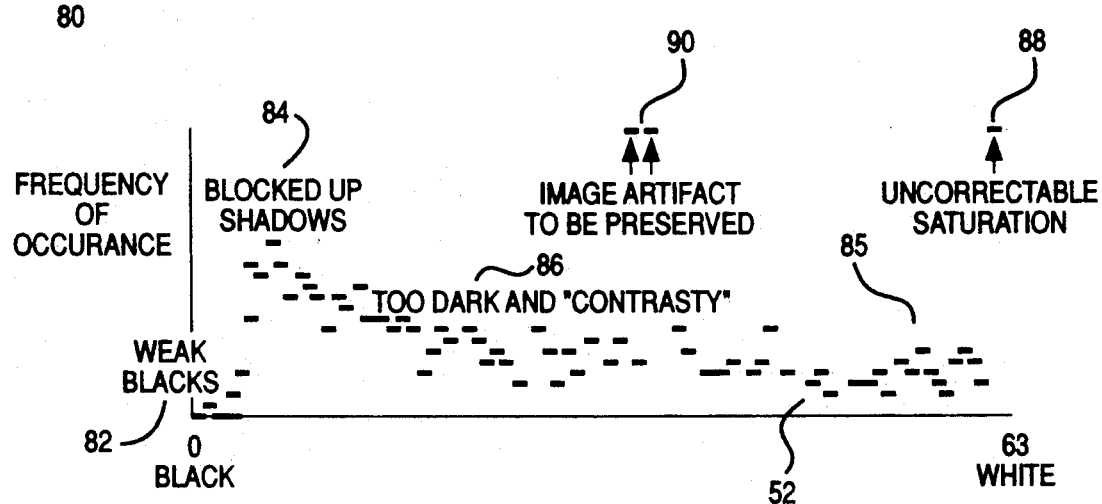
FIG. 6 is a simplified illustration of a histogram of gray scale levels derived from the captured image of FIG. 5.

The second detailed step in the image processing of the invention effects the previously described building of a histogram of gray scale levels as shown in FIG. 6 from the captured "cropped" image of FIG. 5. For each pel in the cropped image of FIG. 5, a red, green, and blue level will be determined. The gray scale graph elements pointed to by the red, green, and blue levels will each be incremented by 4, 4, and 1 respectively. Before discussing the numerous rationales behind construction of a histogram in such a manner, several characteristics of an example the image reflected by the resultant histogram may be noted with reference to FIG. 6. These include the presence of "weak" blacks at reference numeral 82 wherein contrast is so low that shadows all appear substantially the same. Such an image exhibits further characteristics in need of correction such as blocked up shadows at 84, portions of the image at 86 which are too dark and "contrasty" and elements of the image evidencing uncorrectable saturation such as those shown as reference numeral 88. It will also be noted that depicted in the histogram of FIG. 6 are representative image artifacts 90 which are desirably to be preserved while at the same time eliminating those associated with a defective capture process.

As to the rationale for construction of the histogram in such a manner, first, in effecting a gray scale level, wherein all colors are lumped together, it has been empirically observed that brightly colored scenes are low key under one color and high key under another color. Correcting each color image separately would in many applications result in decolorizing many scenes. Still further it will be noted that the gray scale has been incremented by dissimilar values relative to the red, green, and blue levels. It has further been observed empirically that in some color-mapped images, the blue record has higher noise and therefore blue is an unreliable indicator of saturation and has ascribed thereto a lower incrementing value relative to red and green. Moreover, red green, and blue are each counted separately rather than just counting luminance. In this manner, bright colors are correctly accounted for at both ends of the histogram even though luminance would count incorrectly in the middle of the histogram. It will be noted how monochrome images of color prints seem to have more grays than images photographed originally in black and white.

Finally, although green may typically have more visual "weighting" and contain the least noise, the red image is frequently more important in many scenes, tends to have a higher contrast record, and is a better indicator of problems so in net both green and red have been counted equally. Blue, on the other hand, frequently has the highest noise and the lowest visual weight, and images more randomly, and is accordingly ascribed little weight.

Figure 7:
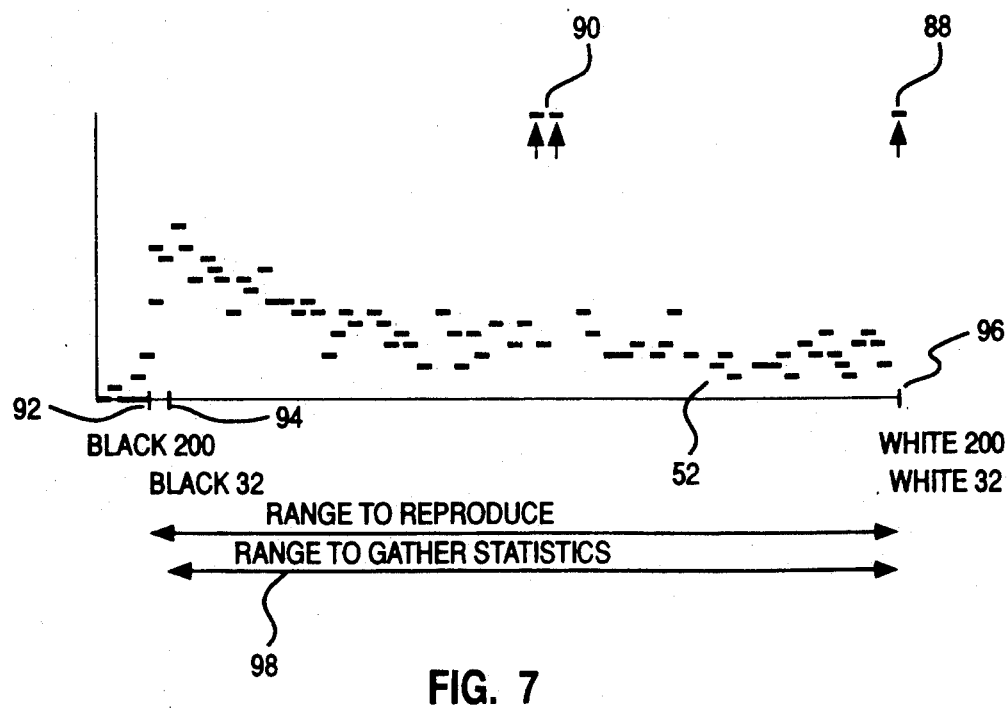
FIG. 7 is another illustration of the histogram of gray scale levels of FIG. 6 indicating establishment of white-black references and the calculated white-black range on the histogram employed to gather statistics in accordance with the invention.

Referring now to FIG. 7, this figure is intended to schematically illustrate the next step in the image processing, namely the establishment of white and black references. First, a total is derived representing the sum of the 64 gray levels. i.e. the total number of all colors counted which is equal to (total number of pels)×(4+4+1). Next a number "black 200" is determined as the highest gray scale value number, such that the number of all lower levels are less than or equal to total/200. In order to do this, the process will desirably count up from black zero and when the sum of all R. G. B is greater than total/200, that level is thence assigned as the value of black 200 shown at reference numeral 92 in FIG. 7.

Similarly, a black 32 value will be determined and ascribed at the value representing total/32. depicted schematically in FIG. 7 as reference numeral 94. Similarly, values for white 32 and white 200 at the top of the histogram are determined shown as reference numeral 96. There are several rationales for the foregoing establishment of black and white references. Essentially this step is performing the same normalization available with the contrast controls at image capture time. Usually, if an image was captured correctly, the "200" points will be at the extreme values of 0 and 63 and the "32" points will be very close to these extreme points. The "200" cutoff points will be the new white-black levels, however statistics will be drawn from the narrower range so that saturation effects are more clearly concentrated at the ends. The difference between the "32" and "200" points allows a smooth rolloff for specular reflections in live images wherein the correction for these specular artifacts are not available at capture time. Examples of specular reflections include those of chrome and sunlight. If such highlights are captured, one frequently has to darken the image to cover the full range from black to white such that a white wall for example will appear undesirably darkened. Whereas specular reflections cannot be ignored completely, in accordance with this step of the method they are not used to set the pure white value and are thus desirably represented by a small range beyond the normal white level. In like manner, in a real world image, a black cutoff point is usually not abrupt but rather darker values will tend to saturate into black, evidencing some vignetting caused by the camera and other capture anomalies. In other words, a histogram would not be expected to rise to saturation and drop immediately to zero but rather will roll off as shown in FIG. 7. However, in the curve fitting in accordance with the invention, it is desirable for the process of the curve fitting not to see this rolloff but rather to see a more uniform curve to fit to or otherwise an inappropriate best fit will result. It is for this reason that rolloff is eliminated in accordance with this step of setting white and black references.

The next step in this detailed embodiment of the image processing is to normalize the histogram so the counts at all gray scale levels average one. This may be effected by multiplying all gray scale counts by (white 32 minus black 32 plus one)/(total count times 63/64). It will be observed that this 63/64 term is actually between 62/64 and 1 for any specific image. The use of white 32 and black 32 gray scale points normalizes the values within the range 98 of FIG. 7. This is the range within which the best fit will be derived.

Figure 8:
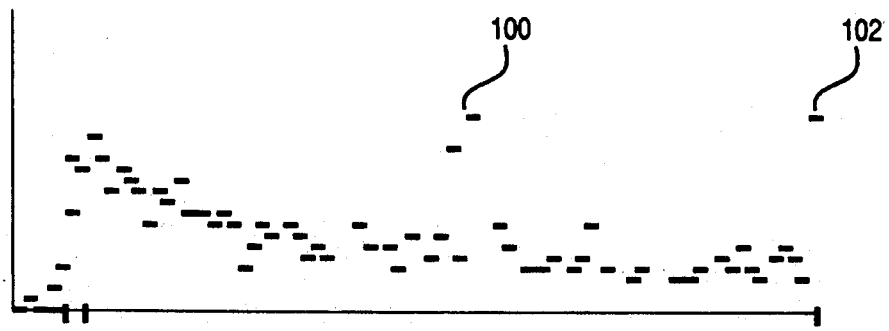
FIG. 8 is another histogram of gray scale levels derived from that of FIG. 7 wherein normalization and sample limiting has been effected, whereby at the high end excess contrast giving rise to noise and single high points giving rise to uncorrectable saturation are avoided and further whereby low ends are limited to ensure a positive best fit curve.

Next, limiting of the curve is effected thereby limiting the extreme points of the histogram which are probably image artifacts such as those shown at reference numeral 90 in FIG. 7 and 100 in FIG. 8. A comparison of the ordinates of these image artifacts at 90 and 100 and uncorrectable saturation elements at 88 and 102 of FIGS. 7 and 8, respectively, will graphically illustrate this limiting function. In addition to the aforementioned limiting or pulling down of the extreme high points, the low points in a histogram in like manner will be pulled up as shown from a comparison of FIGS. 7 and 8. There are several rationales for the foregoing limiting process. First, limiting at the high end is found necessary because by boosting contrast too high, this simply results in noise in the image. Also, it is desirable to ignore single points which are very high because this saturation is uncorrectable. Also, limiting at the low end is provided to ensure that the best fit curve remains positive. A typical limiting function reassigns the count at each level of the gray scale as follows. If the count is less than 0.5. then the count is assigned 0.25+count/2. But if the count is greater than 2, then count=1+count/2, and if the count is still greater than 3, then count=3.

The next step in the image processing is to effect the previously described best fit in the form $A+Bx+Cx^2$. This second order best fit is performed between the black 32 level and white 32 level shown at references numerals 94 and 96 of FIG. 9, with the resulting best fit curve being depicted therein as curve 104. This curve fitting may be effected in a number of manners well known in the mathematical arts with the assistance of computer processing provided by the system depicted in FIGS. 1 and 2.

Figure 9:
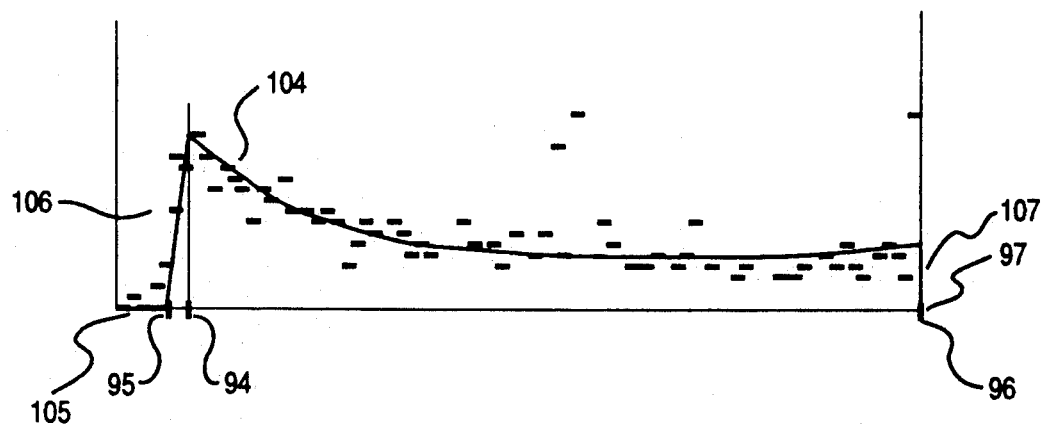
FIG. 9 is an illustrative second order best fit curve of the data depicted in FIG. 8.

Next in accordance with the invention a smooth gray scale graph is created, i.e. given the second order best fit curve 104 of FIG. 9, and the overall range of black 200 at 95 to white 200 at 97, the best fit curve is "smoothed" by providing an overall best fit over the entire range by tapering the edges off as shown for example at 106 in FIG. 9.

In order to translate the curve of FIG. 9 into a lookup table to conveniently apply the correction of that curve to each pixel of image 5, first a "delta" array is created with elements at 0.5. 1.5 2.5, . . . 61.5 and 62.5. Between block 32 plus 0.5 and white 3.2 minus 0.5, the value of the function $f(x)=A+Bc+Cx^2$ with A, B, C determined in the previous step, is evaluated and the results are placed in this delta array 108. Next this f(x) is evaluated at black 32 and assigned a value Y. If black 32 does not equal black 200, then the process will step by one between black 200 plus 0.5 and black 3.2 minus 0.5 and the delta array is then set equal to Y×(N−black 200)/(black 32−black 200).

Continuing with this step of creating the delta array, if black 200 does not equal 0 then the delta array is zeroed between 0.5 and black 200−0.5. Next, the function f(x) is evaluated at white 32 and assigned a value Y. If white 32 is not equal to white 200, then between white 32+0.5 and white 200−0.5, the delta array is set to equal the value Y×(white 200−N)/(white 200−white 32). If white 200 is not 63 then the delta array is zeroed between white 200 plus 0.5 and 62.5.

The previous two paragraphs are stated algorithmically. There effect is to place in the delta array 105 numbers corresponding to curve 104 of FIG. 9, complete with tapered ends 106 and 107, and 0 segments 105.

There several rationales for this step of the process. The curve in FIG. 9 comprising segments 104, 106, 107, and 105 is the gray scale graph that needs to be corrected. The step has removed both image artifacts we desire to preserve as well as uncorrectable capture anomalies. Sections of the gray scale with high concentration of pels need to be expanded proportionally to that concentration. The delta, or difference array, holds the difference which must be obtained between the converted gray scale of two states and the final convert array to flatten the curve of the final converted image. Still further, at the ends between the 32 and the ultimate 200 points, a smooth descent is provided and wherein beyond the 200 points, no gray scale is allocated.

Figure 10:
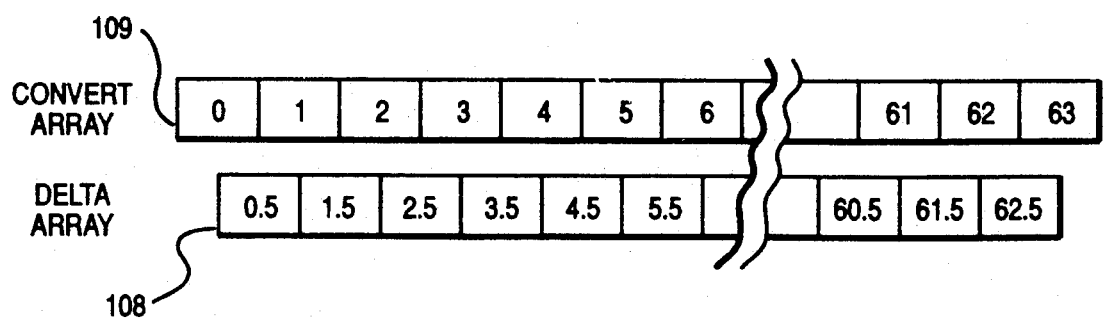
FIG. 10 is a pair of delta arrays derived from the data of FIG. 9, used to correct the image of FIG. 5.

As a final step in the processing method, a correction lookup table is generated based upon the overall best fit and utilized to correct the image. First a convert array 109 in FIG. 10 is generated with elements from 0 to 63. The first element of the convert array is set=0. Then, for N from 1 to 63, the method sets the convert array (N)=convert array (N−1)+delta array (N−0.5). Next, the process again scans for N=0 to 63, and sets the convert array (N)=convert array (N)/convert array (63). This produces the normalized lookup convert array. Essentially, it integrates the delta array to give the biggest jump in gray scale at those levels of gray that had the highest concentration of pels.

Up to this point, the convert array has been normalized between 0.0 to 1.0. Next, in accordance with the image processing of the invention, the convert array is intergized. If color values must be 6 bits each, each element of the convert array is translated using a function of the form truncate (convert array (N)×63.99). Finally the actual conversion from the original image to the corrected image that is the product of this invention is performed with this convert array. For each color of each pel of the original image, the 6 bit value of the color is utilized as a pointer into the convert array, and a new 6 bit value is received back to replace the old value. In this manner, pels corresponding to a corrected image are thereby created which may be utilized in any desired manner thereafter such as in the display of the corrected image on the monitors 5 or 7 in FIG. 1.

Figure 11:
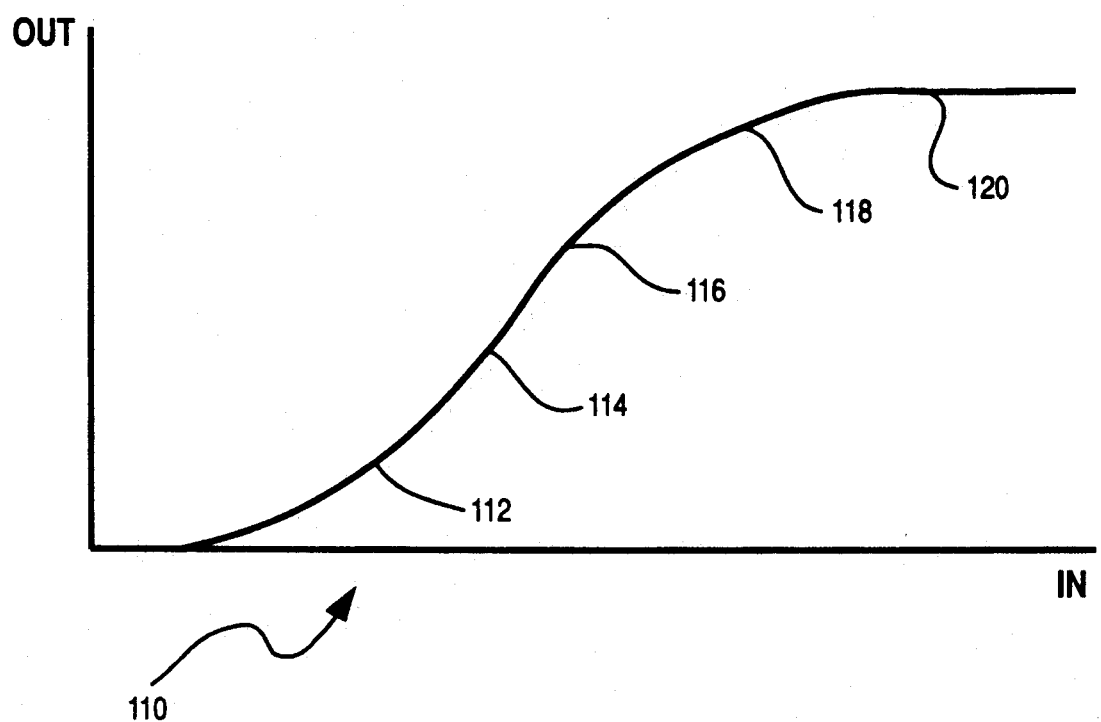
FIG. 11 depicts the histogram of FIG. 6 in an integrated transfer curve more common to those familiar with film-based images.

It will noted that the foregoing image processing of the invention may also be understood in terms of a more conventional approach of transfer function theory associated with negatives, for example in the photographic art, such a transfer function 110 being shown in FIG. 11. This function typically has several areas associated with it including an area 112 resulting in underexposed areas, a low contrast toe 114, a high contrast middle 116, a low contrast shoulder 118 and a saturation level 120.

It will be appreciated that this transfer function may be seen as the integral of the previously described histogram. In other words, integration of the f(x) yields a function of the form $Z+Ax+Bx^2+Cx^3$. These coefficients Z, A, B, and C map to a black level, white level, gamma, and saturation, respectively. In other words the coefficient C of the integration maps to the C of the histogram function inasmuch as the integral of $Cx^2 = Cx^3/3$. Thus the foregoing should remove any confusion with respect to use of an $X^3$ term for gamma correction in the prior art.

In the foregoing, it will be appreciated that the extreme points 90 of FIG. 6 of the histogram have been limited, however the invention is not intended to be limited in scope to such treatment of these points. As an example, these points may, rather than be limited, simply be decreased in weight as the best fit is performed which may yield an equivalent but slightly different result. In other words, an iterative best fit may also be desirable in some applications. A first pass best fit would accordingly be performed. Then based upon how far these extreme points are from the first pass curve fit, a second pass fit would be performed wherein they are simply weighted less as a function of their distance from the curve fit by the first pass. It will be seen from the foregoing by simply limiting the extreme points this is merely an expedient in taking these extreme points into account which may be refined by such weighting of these points.

While the invention has been shown and described with reference to particular embodiments thereof, it will be understood by those skilled in the art that the foregoing and other changes in form and details may be made therein without departing from the spirit and scope of the invention.

We claim:

1. A method for use in a system for automatic correction of video data derived from a single video image comprised of pels into corrected video image data comprised of corrected pels, each corresponding to a respective one of said pels, comprising
   generating a gray scale histogram of said image data of a single image;
   generating a best fit regression function of said histogram wherein said generation of said best fit regression function comprises:
   generating a plurality of iteratively generated second order best fit functions of said histogram comprising at least a first best fit function and a subsequent second best fit function;
   wherein, for said second function, peaks of said second best fit function are weighted as a function of their distances from corresponding points on said first best fit function to generate a second weighted function for use as said regression function:
   generating a convert array from said regression function relating each of said pels to a corresponding one of said corrected pels;
   modifying said image data as a function of said regression function, said modifying comprising
   detecting from said array for said each of said pels said corresponding one of said corrected pels; and
   substituting in said image data for each of said pels said corresponding one of said corrected pels to generate said corrected video image.

2. The method of claim 1 wherein said best fit function is a polynomial.

3. The method of claim 2 wherein said polynomial is second order.

4. The method of claim 3 wherein said image data spans a fully gray scale range and wherein said best fit function is completed over a range less than said full gray scale range.

5. The method of claim 4 wherein said range less than said full gray scale range is between limits selected to include a selected percentage of said histogram.

6. The method of claim 5 wherein said range less than said full gray scale range comprises a selective percentage of said histogram encompassing a range from calculated values of black to white in said image.

7. The method of claim 6 wherein said
   histogram defines opposing edges between which said best fit function is polynomial and further defines opposing end; and
   wherein said best fit function outside said range less than said full gray scale range decreases from polynomial values at said edges of said range to zero at said ends of said histogram.

8. The method of claim 1 wherein prior to generation of said regression function said histogram is normalized.

9. The method of claim 8 wherein, in said normalized histogram, contrasts of said image data are thereby adjusted to set white and black reference levels.

10. The method of claim 1 further including operating on a color image in which said histogram is a weighted average of histograms of each color record individually.

11. The method of claim 10 wherein the weight assigned blue is less than the weight assigned red or green.

12. A method for use in a system for automatic correction of video data derived from a single video image comprised of pels into corrected video image data comprised of corrected pels, each corresponding to a respective one of said pels, comprising generating a gray scale histogram of said image data of a single image;

generating a best fit regression function of said histogram wherein said best fit function comprises a weighted second function generated by the steps of:

generating a plurality of sequential second order best fit functions of said histogram wherein, for each of said sequential second order best fit functions, histogram values are weighted as a function of their distances from corresponding points on a previous one of said second order best fit functions to generate said weighted second function;

generating a convert array from said regression function relating each of said pels to a corresponding one of said corrected pels;

modifying said image data as a function of said regression function, said modifying comprising detecting from said array for said each of said pels said corresponding one of said corrected pels; and substituting in said image data for each of said pels said corresponding one of said corrected pels to generate said corrected video image.

* * * * *